(12) United States Patent
Mahadik et al.

(10) Patent No.: US 11,995,571 B1
(45) Date of Patent: *May 28, 2024

(54) DETERMINATION OF DECISION STEP LOGIC FOR INCIDENT RESPONSE IN AN INFORMATION TECHNOLOGY ENVIRONMENT

(71) Applicant: Splunk Inc., San Francisco, CA (US)

(72) Inventors: Atif Mahadik, Freemont, CA (US); Govind Salinas, Sunnyvale, CA (US); Sourabh Satish, Freemont, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,533

(22) Filed: Oct. 6, 2022

Related U.S. Application Data

(63) Continuation of application No. 16/119,322, filed on Aug. 31, 2018, now Pat. No. 11,501,184.

(51) Int. Cl.
| | |
|---|---|
| *G06Q 10/0631* | (2023.01) |
| *G06F 8/34* | (2018.01) |
| *G06N 5/02* | (2023.01) |
| *G06N 5/04* | (2023.01) |

(52) U.S. Cl.
CPC .............. *G06N 5/04* (2013.01); *G06N 5/02* (2013.01); *G06Q 10/06316* (2013.01); *G06F 8/34* (2013.01)

(58) Field of Classification Search
CPC . G06F 11/0709; G06F 11/0793; G06Q 10/06; G06N 5/02; G06N 5/04
See application file for complete search history.

(56) References Cited

U.S. PATENT DOCUMENTS

| | | | |
|---|---|---|---|
| 8,265,980 B2 | 9/2012 | Ochs et al. | |
| 9,715,675 B2* | 7/2017 | Chakravarty | G06Q 10/06 |
| 10,089,213 B1* | 10/2018 | Noble | G06F 11/366 |
| 11,017,300 B1* | 5/2021 | Kapoor | G06Q 10/06311 |
| 2007/0174693 A1 | 7/2007 | Gerber | |
| 2008/0040191 A1 | 2/2008 | Chakravarty et al. | |
| 2013/0132060 A1 | 5/2013 | Badhe et al. | |
| 2019/0108470 A1 | 4/2019 | Jain | |
| 2019/0340004 A1* | 11/2019 | Garay | G06Q 10/0631 |

OTHER PUBLICATIONS

Non-Final Office Action, U.S. Appl. No. 16/119,322, dated Feb. 10, 2022, 17 pages.
Notice of Allowance, U.S. Appl. No. 16/119,322, dated Jul. 26, 2022, 9 pages.

\* cited by examiner

*Primary Examiner* — Ziaul A Chowdhury
(74) *Attorney, Agent, or Firm* — Nicholson De Vos Webster & Elliott LLP

(57) ABSTRACT

Described herein are improvements for generating courses of action for an information technology (IT) environment. In one example, a method includes determining that a decision step occurs between a one step and two or more other steps of a first course of action associated with an incident type in the information technology environment. The method further includes determining possible outputs of the one step that, when used as input to the decision step, cause the first course of action to proceed from the decision step to respective steps of the two or more other steps. The method also includes incorporating logic into the decision step to direct the course of action to respective steps of the two or more other steps based on one or more of the possible outputs.

20 Claims, 10 Drawing Sheets

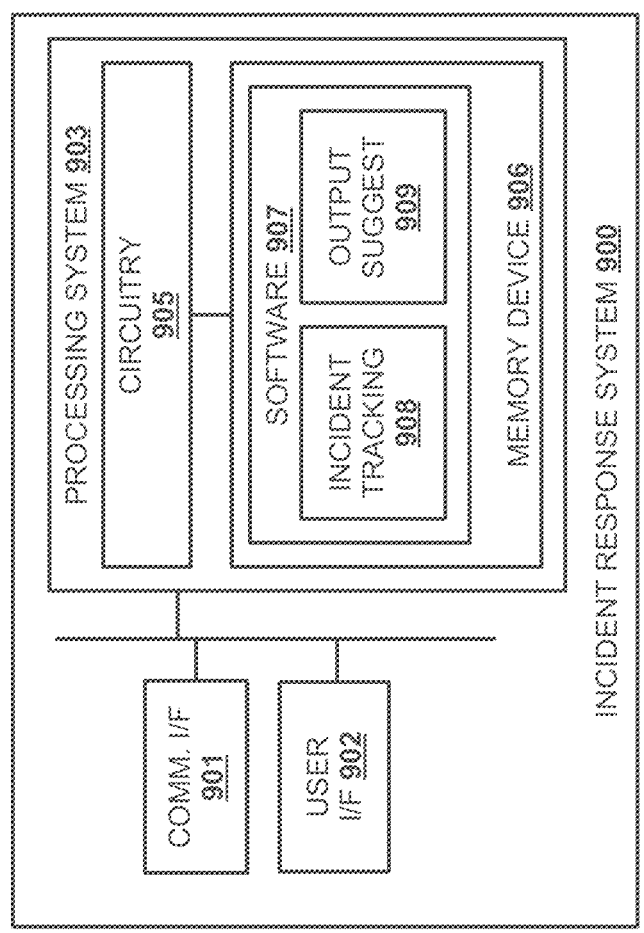

DETERMINATION OF DECISION STEP LOGIC FOR INCIDENT RESPONSE IN AN INFORMATION TECHNOLOGY ENVIRONMENT

CROSS-REFERENCE TO RELATED APPLICATION

This application claims benefit under 35 U.S.C. § 120 as a continuation of U.S. application Ser. No. 16/119,322, filed on Aug. 31, 2018, the entire contents of which are hereby incorporated by reference as if fully set forth herein. Applicant hereby rescinds any disclaimer of claim scope in the parent application or the prosecution history thereof, and advises the USPTO that the claims in this application may be broader than any claim in the parent application.

TECHNICAL BACKGROUND

Information technology (IT) environments often employ various computing components, both physical and virtual, to provide desired operations. These computing elements may include end user computing devices, host computing devices, virtual machines, switches, routers, firewalls, and the like. To maintain efficient and effective operations of the IT environment, incident response services may be employed that can respond to various incidents within the IT environment. These incidents may include or be associated with viruses, malware, spyware, denial of service attacks, phishing attacks, server crashes, device failures, power outages, unknown communications, or some other similar incident.

However, while incident response services provide response operations to incidents within the IT environment, difficulties arise as the size and complexity of the IT environment increases. These difficulties are often compounded when the new computing components provide different operations and are configured with varying hardware and software configurations. Further, the increasing number computing components in combination with limited administrative personnel and resources can make it difficult to manage the investigation and remediation of incidents in the environment. Even with ample administrators or analyst users, it can be cumbersome to coordinate the investigation and remediation efforts.

Overview

Described herein are improvements for generating courses of action for an information technology (IT) environment. In one example, a method includes determining that a decision step occurs between a one step and two or more other steps of a first course of action associated with an incident type in the information technology environment. The method further includes determining possible outputs of the one step that, when used as input to the decision step, cause the first course of action to proceed from the decision step to respective steps of the two or more other steps. The method also includes incorporating logic into the decision step to direct the course of action to respective steps of the two or more other steps based on one or more of the possible outputs.

BRIEF DESCRIPTION OF THE DRAWINGS

FIG. 9 illustrates an example computing architecture for automatically determining decision step logic in a course of action for IT incident response.

DETAILED DESCRIPTION

For a particular information technology (IT) environment, one or more administrative users can be tasked with maintaining the devices, systems, and networks of the IT environment. Maintenance tasks may include handling any incidents that the IT environment encounters. Incidents that may constitute security threats may include malware (e.g., viruses, worms, ransomware, etc.), denial of service attacks, unauthorized access attempts, information fishing schemes, or some other type of computer or network related event that could adversely affect the IT environment or users of the IT environment. Other types of incidents, such as operational incidents (e.g., software issues, hardware issues, connectivity issues, etc.), that may occur within an IT environment may also be handled. Upon being notified of an incident, an administrative user uses tools provided by the IT environment to perform various actions for handling the incident. The tools may include functions that, depending on the type of incident, find the source of the incident (e.g., a source address or domain of a network attack), remove an offending process (e.g., deleting malware), isolate an affected asset of the IT environment in a VLAN, identify assets related to the affected asset, implementing a firewall rule (e.g., to block certain network traffic), or any other action for identifying whether an incident is a security threat and, if so, to neutralize the security threat.

The actions taken by a user when handling one type of incident may be different from those taken when handling a different type of incident. If the user has not handled a similar incident recently, the user may take longer than desired to perform actions necessary to handle the incident. Likewise, the user may unnecessarily perform actions that are ineffective at handling the incident because the user may not know any better. The examples herein assist the user in at least the aforementioned situations by allowing the user to define a course of action and assist the user when defining the course of action. A course of action is a defined set of action steps that instruct an incident response system to perform actions when responding to an incident in an IT environment. The course of action may define a particular sequence in which at least a portion of the steps should be performed and define which steps can be performed in parallel. In some cases, a course of action may provide multiple potential paths subsequent to a particular step. A decision step is used to determine which one (or more) of those multiple paths is taken depending on the output of the particular step. A user may not be aware of, or be confident about, what outputs should lead to which of the multiple paths. As such, implementations herein automatically determine the outputs, or at least provide suggestions of the outputs, for use in the logic of the decision step.

Figure 1:
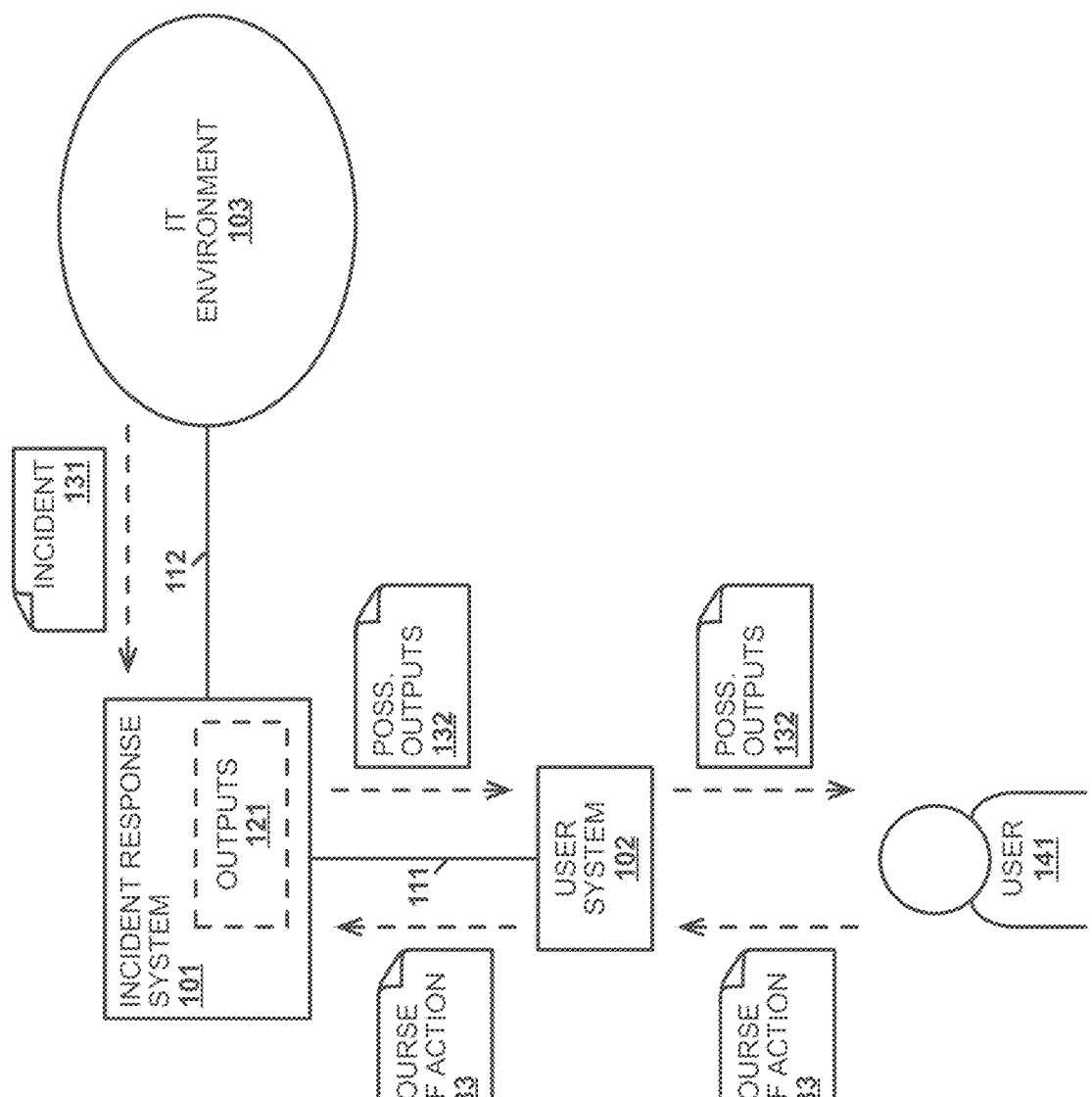
FIG. 1 illustrates an example implementation for automatically determining decision step logic in a course of action for IT incident response.

FIG. 1 illustrates implementation 100 for automatically determining decision step logic in a course of action for IT incident response. Implementation 100 includes incident response system 101, user system 102, and IT environment 103. Incident response system 101 and user system 102 communicate over communication link 111. Incident response system 101 and IT environment 103 communicate over communication link 112. Communication link 111 and communication link 112 may be direct links or may include one or more intervening systems, networks, and/or devices. While shown outside of IT environment 103, incident response system 101 and user system 102 may be considered part of IT environment 103.

In operation, user 141 is one of what may be multiple users tasked with handling incidents, which are potential security threats in this example, in IT environment 103. It should be understood that other types of incidents, such as operational incidents, may also be handled in accordance with the description below. User 141 operates user system 102, which may be a personal workstation or other computing device of user 141, to receive information about incidents that occur in IT environment 103 and to instruct incident response system 101 to handle those incidents by performing various actions. A course of action provides step-by-step, high level instructions to incident response system 101 for handling a particular type of incident. Once defined, incident response system 101 can follow the course of action to respond to an incident, such as incident 131, in IT environment 103. In some examples, user 141 may operate incident response system 101 directly through a user interface thereof rather than using a separate system, such as user system 102. Likewise, in some examples, the tasks performed by user system 102 and incident response system 101 may be distributed differently between user system 102 and incident response system 101. In those examples, the combination of incident response system 101 and user system 102 as a whole may be considered an incident response system.

Figure 2:
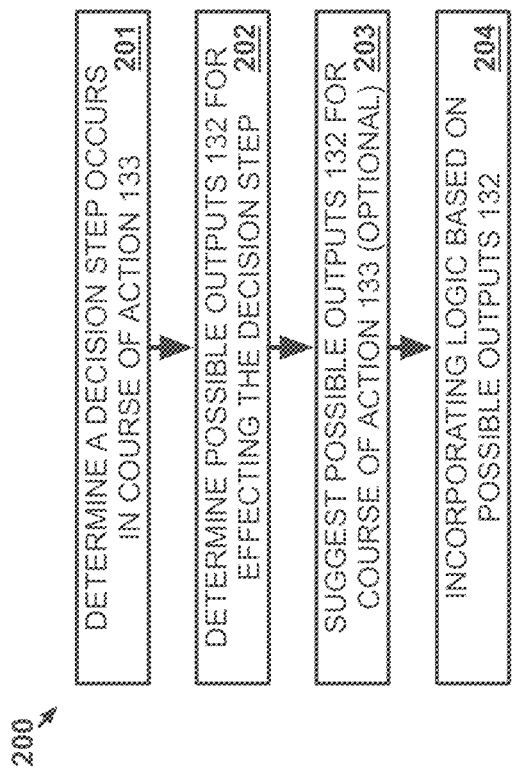
FIG. 2 illustrates an example operation for automatically determining decision step logic in a course of action for IT incident response.

FIG. 2 illustrates a flowchart of operation 200 for automatically determining decision step logic in a course of action for IT incident response. Operation 200 may be performed in response to incident response system 101 identifying incident 131 or may be performed at some other time. For example, user 141 may determine that course of action 133 is needed for a particular type of incident, such as incident 131's type, and defines course of action 133 via user system 102 accordingly. In some examples, course of action 133 may have been defined by a user other than user 141 and user 141 edits or otherwise contributes to course of action 133. Operation 200 provides that incident response system 101 determines that a decision step occurs between a one step and two or more other steps of course of action 133 associated with an incident type in IT environment 103 (201). A decision step occurs in a course of action between a particular step and two or more respective steps that could be performed depending on the output of the particular step. For example, a decision step may be placed by user 141 after step A and before steps B, C, and D. Incident response system 101 uses the output of step A at the decision step to determine which of step B, C, or D should be performed next. Incident response system 101 may identify the decision step when the decision step is entered into course of action 133 by user 141 or may identify the decision step by analyzing course of action 133 at another time after the decision step was entered into course of action 133.

Incident response system 101 then determines possible outputs 132 of the one step that, when used as input to the decision step, cause course of action 133 to proceed from the decision step to respective steps of the two or more other steps based on the decision step in other courses of action (202). Possible outputs 132 may be determined from outputs 121, which are maintained by incident response system 101 from courses of action other than course of action 133 or from action sequences, such as those manually performed by user 141, or another user, or even action steps performed automatically by incident response system 101, that went from the one step to at least one of the two or more other steps (e.g., if user 141 first directed incident response system 101 to perform the one step and then a particular step of the two or more other steps, then incident response system 101 may infer, for the single instance or from a pattern of occurrences, that the output of the one step caused user 141 to decide to perform the particular step). Incident response system 101 may analyze decision steps from the other courses of action to identify those decision steps that are similar to the decision step of course of action 133. For example, a decision step may be similar due to the similar decision step also occurring after the one step and before the same two or more other steps as the decision step in course of action 133. In other examples, a decision step may still be considered similar if only a portion of the subsequent steps are the same as the two or more other steps that are after the decision step of course of action 133. Each of possible outputs 132 identify the output that would cause the decision step to proceed to a particular one of the two or more other steps. Each of possible outputs 132 may be a particular value or may include a range of values. In some examples, a possible output 132 may comprise a catchall, such as anything that did not satisfy one of the other possible outputs. possible outputs 132 may be identified from outputs 121 as being outputs that are used above a threshold frequency in similar decision steps, those outputs that are used in similar decision steps of other courses of action having above a threshold success rate for responding to incidents, or use some other criteria for paring down which outputs are best to include in possible outputs 132—including combinations thereof.

Optionally, once incident response system 101 has determined possible outputs 132, incident response system 101 may suggest possible outputs 132 to user 141 by presenting possible outputs 132 to user 141 via a user interface of user system 102 (203). In those examples, user 141 may indicate that they would like to receive suggestions for possible outputs that may be used with the decision step or incident response system 101 may provide them automatically. Possible outputs 132 may include more than the number of possible outputs needed for the decision step. For example, possible outputs 132 may provide multiple outputs of step A that could cause the decision step to lead to step C. In those examples, user 141 may provide input as to which of the multiple outputs user 141 would like to lead to step C. In other cases, even if only one possible output is given for each of the two or more other steps, then user 141 may still provide input accepting those possible outputs for use in the decision step. Alternatively, user 141 may provide a different output(s) for the decision step to use besides those suggested by possible outputs 132.

Incident response system 101 then incorporates logic into the decision step to direct the course of action to respective steps of the two or more other steps based on possible outputs 132 (204). The logic essentially comprises Boolean logic corresponding to each of the two or more steps. Each item of Boolean logic, when applied to the output of the one step, either results in directing course of action 133 to a corresponding one of the two or more steps when satisfied or else another Boolean query is applied to the output of the one step. For example, if the output of step A does not satisfy a Boolean logic that would direct course of action 133 to step B, then another Boolean logic is applied to the output to determine whether course of action 133 should be directed to step C. In some cases, incident response system 101 automatically converts whichever possible outputs 132 are determined into logic for the decision step and incorporates that logic into the decision step. In those cases, possible outputs 132 would not be able to have multiple conflicting optional outputs corresponding to any one of the two or more steps. In examples where incident response system 101 presents possible outputs 132 to user 141, only those of possible outputs 132 that are selected by user 141 may be incorporated as logic into the decision step.

Advantageously, even if user 141 does not know, or is unsure of, what outputs of the one step should be used to direct course of action 133 to any of the two or more other steps, incident response system 101 is able to provide possible outputs 132. Incident response system 101 can then incorporate logic into the decision step in accordance with possible outputs 132.

Figure 3:
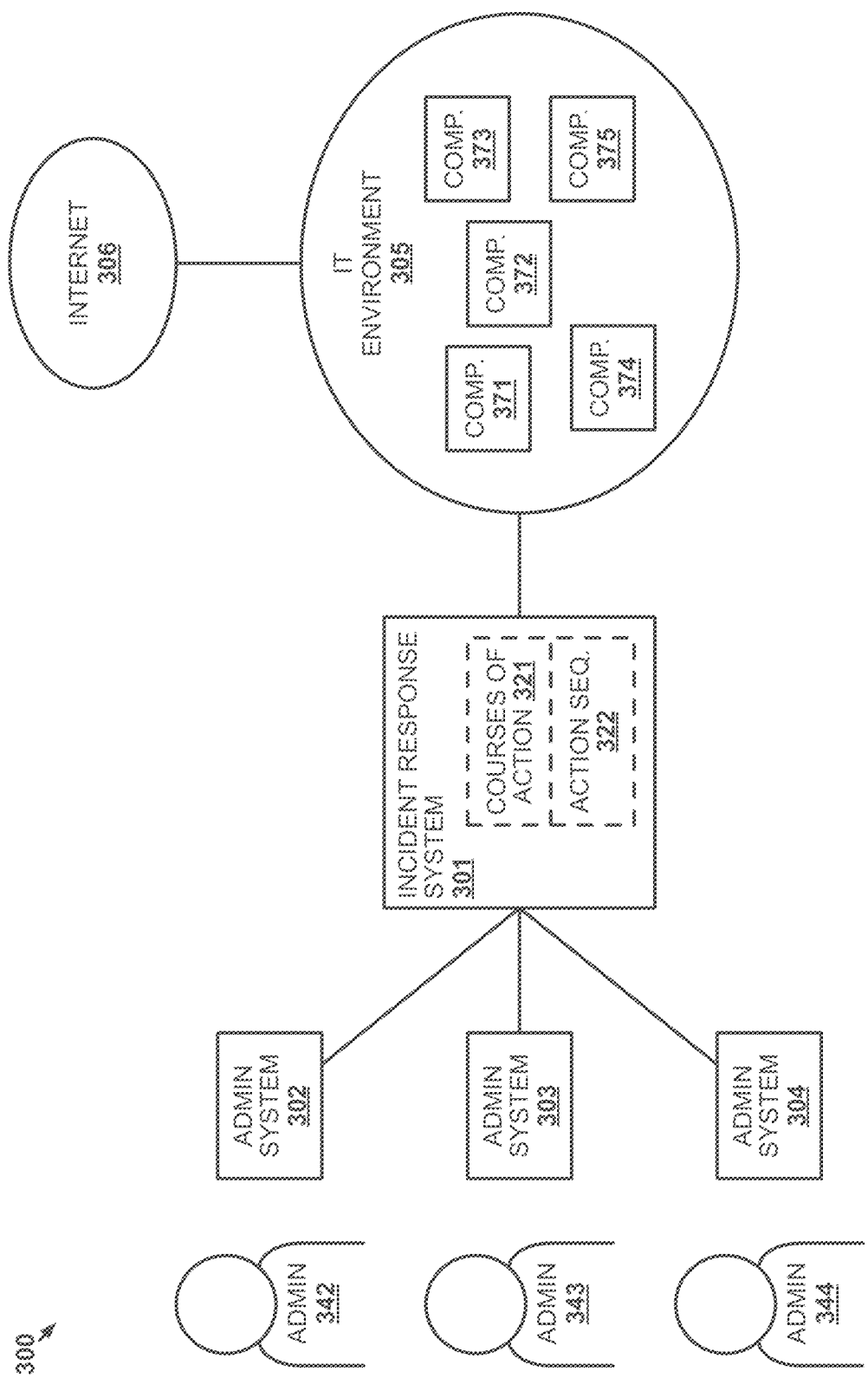
FIG. 3 illustrates an example implementation for automatically determining decision step logic in a course of action for IT incident response.

FIG. 3 illustrates implementation 300 for automatically determining decision step logic in a course of action for IT incident response. Implementation 300 includes incident response system 301, administrative user system 302, administrative user system 303, administrative user system 304, IT environment 305, and Internet 306. Component 371, component 372, component 373, component 374, and component 375 may comprise any combination of physical computing systems (e.g. personal computing systems, host computing systems, servers, and the like), virtual computing systems (e.g. virtual machines or containers), routers, switches, or some other similar computing element. While Internet 306 is shown connected only to IT environment 305, Internet 306 may be used for communications with any element of implementation 300.

In operation, administrator 342, administrator 343, and administrator 344 are users associated with maintaining the security of IT environment 305. Administrator 342, administrator 343, and administrator 344 operate administrative user system 302, administrative user system 303, and administrative user system 304, respectively, to perform their duties with respect to the security of IT environment 305. Administrative user system 302, administrative user system 303, and administrative user system 304 communicate with incident response system 301 to handle incidents that occur within IT environment 305.

Figure 4:
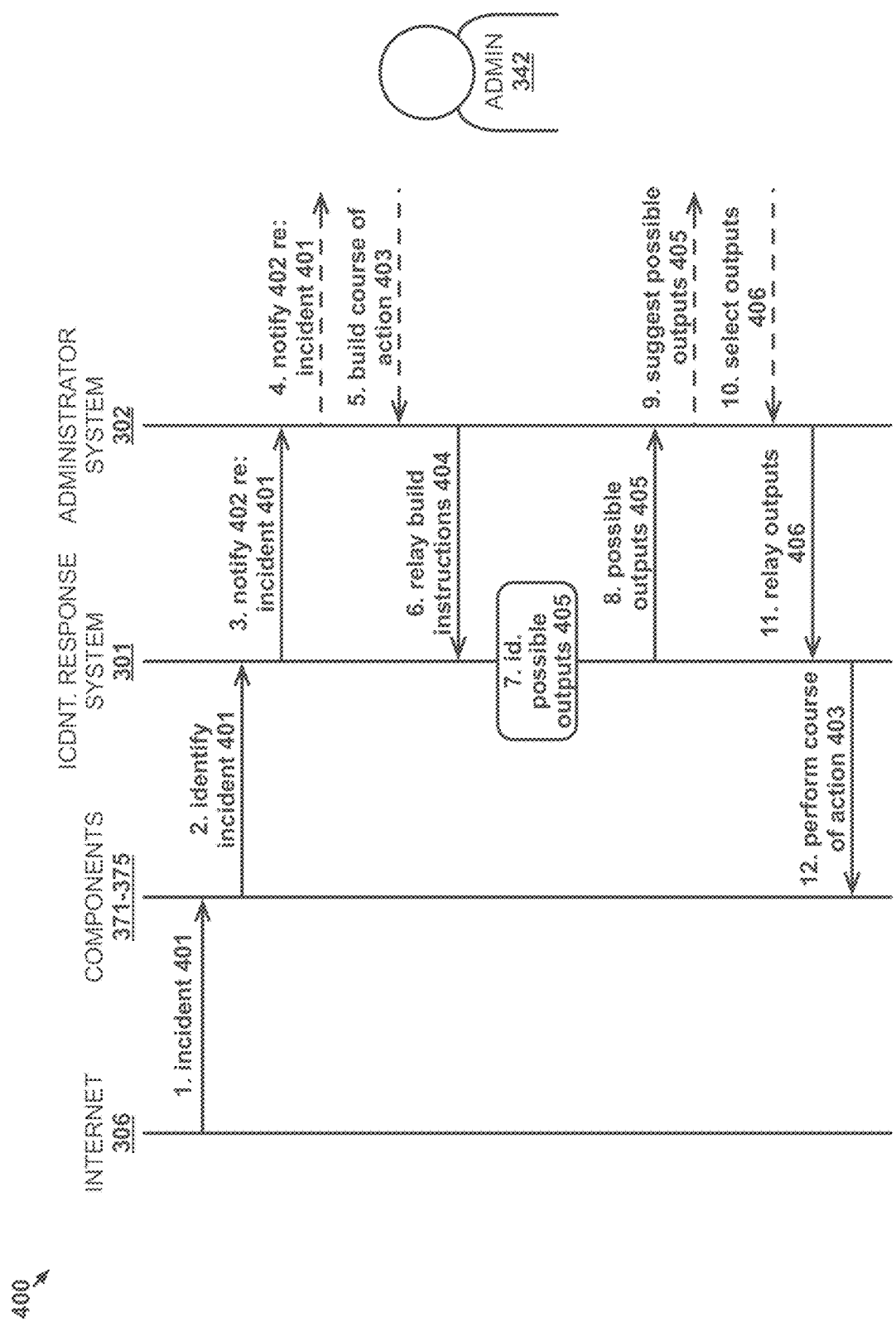
FIG. 4 illustrates another example operation for automatically determining decision step logic in a course of action for IT incident response.

FIG. 4 illustrates a sequence diagram of operational scenario 400 for automatically determining decision step logic in a course of action for IT incident response. In operational scenario 400, incident 401 occurs at step 1, which originates from Internet 306 and affects one or more of components 371-375. In other examples, incident 401 may originate from within IT environment 305 (e.g., a user may install malware onto one of components 371-375). After occurrence of incident 401, incident response system 301 identifies incident 401 at step 2 by being notified of incident 401 from components 371-375. For example, if one of components 371-375 is a firewall that detects suspicious network behavior as being incident 401, then the firewall will notify incident response system 301 of incident 401. The notification of incident 401 may include information describing characteristics of incident 401, such as a source network address/domain, incident type (e.g., virus, fishing, denial of service attack, unauthorized access request, etc.), which of components 371-375 were affected, or any other type of information descriptive of incident 401 that may also be used to compare incident 401 to other incidents.

Upon identifying incident 401, incident response system 301 transfers notification 402 to one or more of administrator user systems 302-304 at step 3 that incident 401 has occurred. In this example, incident response system 301 selects administrator 342 to handle incident 401 and transfers notification 402 to administrative user system 302 associated with administrator 342. In an alternative example, incident response system 301 may transfer notification 402 to multiple, or all, of administrator user systems 302-304 and allow administrators 342-344 to decide who should handle incident 401 or work together to handle incident 401.

Administrative user system 302 responsively presents notification 402 at step 4 to administrator 342. Administrator 342 responsively handles incident 401 by providing handling instructions in the form of defining course of action 403 at step 5 via administrative user system 302. The instructions 404 defining course of action 403 are then passed at step 6 from administrative user system 302 to incident response system 301. Instructions 404 may be provided by administrator 342 through the use of a visual programming language like that described in conjunction with FIGS. 6-8, although other manners of providing instructions to a computing device may also be used.

A decision step is included in instructions 404 defining course of action 403 that directs course of action 403 to one of multiple paths stemming from the decision step. In this example, administrator 342 does not provide logic for how the decision step should choose which path to path to proceed down. As such, incident response system 301 identifies possible outputs 405 at step 7 from other instances of the decision step, which may include similar instances of the decision step, in other courses of action 321 maintained by incident response system 301. Operation 500 describes in more detail how incident response system 301 may determine possible outputs 405.

Possible outputs 405 are transferred to administrative user system 302 at step 8 so administrative user system 302 can present possible outputs 405 to administrator 342 at step 9. In this example, possible outputs 405 may be presented to administrator 342 in conjunction with selectable elements that allow administrator 342 to identify which of the outputs administrator 342 desires to be used in the decision step for routing to respective ones of the multiple paths stemming from the decision step. Using the selectable elements, administrator 342 indicates outputs 406 from possible outputs 405 at step 10. Outputs 406 may be selected solely from those suggested in possible outputs 405 or at least a portion of outputs 406 may be defined by administrator 342. For example, administrator 342 may use outputs of possible outputs 405 for a portion of the paths stemming from the decision step and may define other outputs for the remaining paths.

Outputs 406 are then relayed to incident response system 301 for incorporation as logic into the decision step of course of action 403 at step 11. Once the decision step has the logic necessary to operate on outputs from the step of course of action 403 that precedes the decision step, course of action 403 is ready to operate on incident 401. Incident response system 301 follows the instructions of course of action 403 to handle incident 401 at step 12. In this example, steps of course of action 403 require incident response system 301 to interact with one or more of components 371-375. For example, if one of step of course of action 403 is to create a firewall rule, then incident response system 301 may create the firewall rule and transfer the firewall rule to one or more of components 371-375 that comprise a firewall. Incident response system 301 may be able to perform a portion of the actions defined by course of action 403 without interacting with components 371-375 or may interact with systems outside of IT environment 305 to perform a portion of the actions. It should be understood that course of action 403 in the above example only included one decision step in need of decision-making logic, but other examples may include other decision steps for which logic may be incorporated in a manner similar to that described above.

Figure 5A:
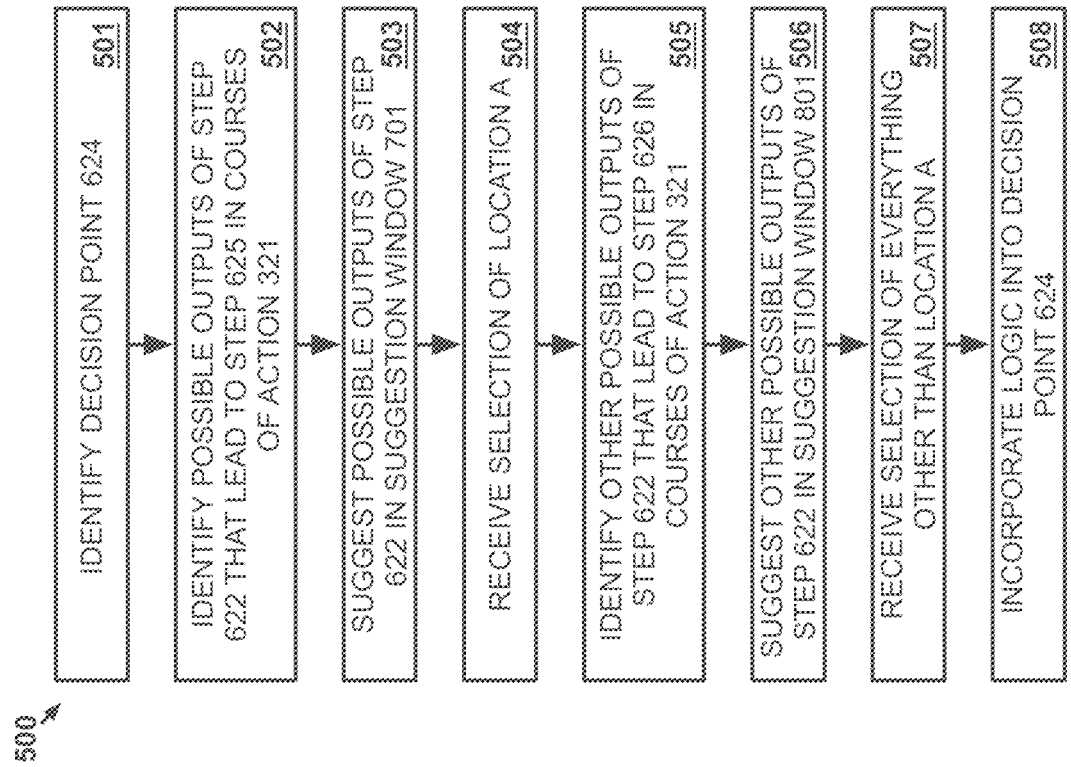
FIG. 5A illustrates yet another example operation for automatically determining decision step logic in a course of action for IT incident response.

FIG. 5A illustrates a flow diagram of operation 500 for automatically determining decision step logic in a course of action for IT incident response. Operation 500 will be described in conjunction with user interfaces 600, 700, and 800 in FIGS. 6-8. Specifically, operation 500 describes a more detailed example of incorporating logic into a decision step of course of action 403 from operational scenario 400.

Figure 6:
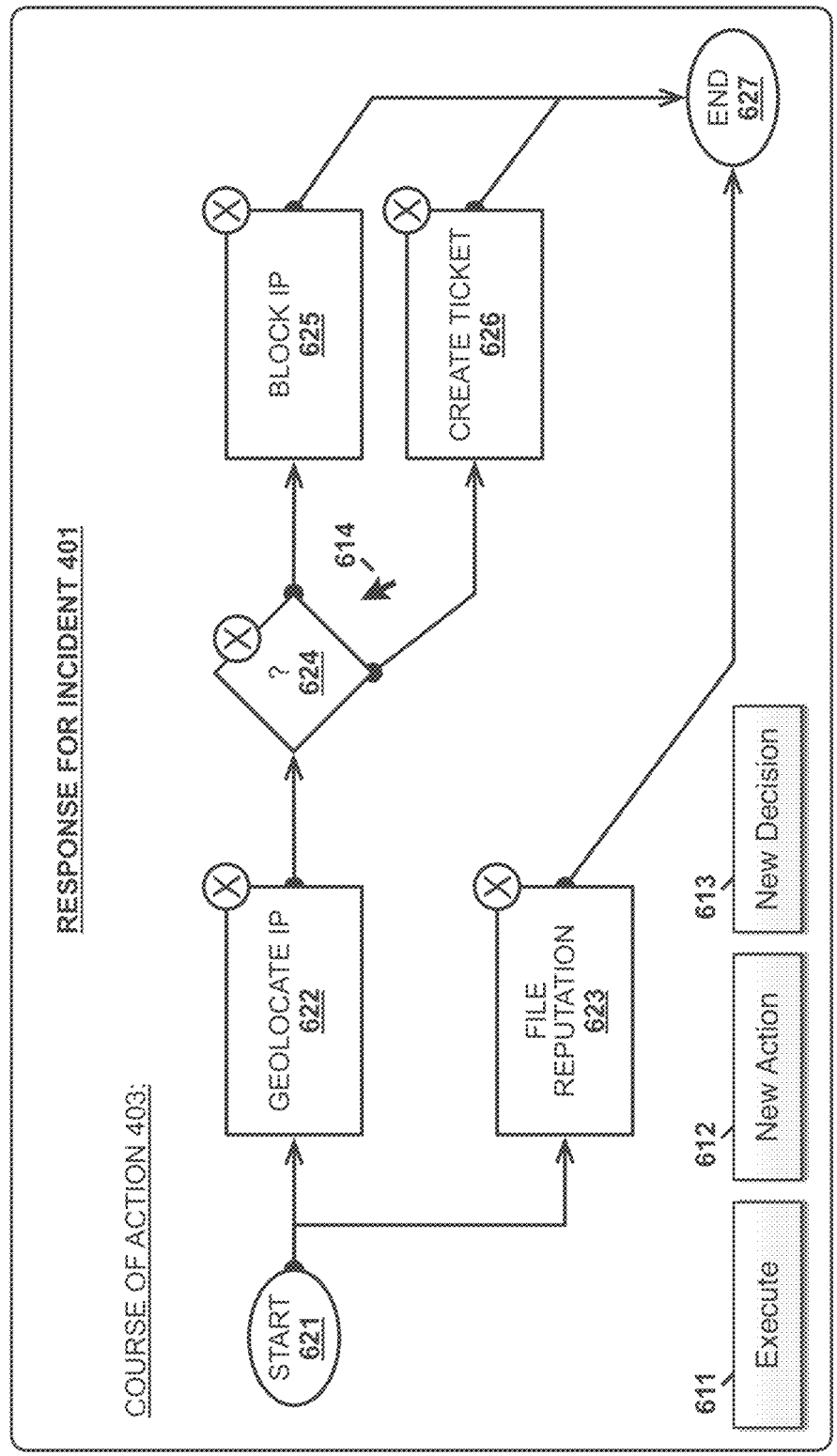
FIG. 6 illustrates an example user interface for automatically determining decision step logic in a course of action for IT incident response.

FIG. 6 illustrates user interface 600 for automatically determining decision step logic in a course of action for IT incident response. User interface 600 is an example of how administrative user system 302 may display course of action 403 to administrator 342. Course of action 403 is represented as a block flow diagram in a window for defining course of action 403 in response to incident 401. Course of action 403 includes start point 621, end point 627, and decision point 624, and four action blocks, which include geolocate IP action 622, file reputation action 623, block IP action 625, and create ticket action 626 visually represented by blocks therein. The block diagram representing course of action 403 may comprise a visual programming language for courses of action, which allows for graphical manipulation (e.g., by manipulating the blocks in this example) of the course of action. The visual programming language is essentially a high-level representation of underlying instructions for incident response system 301 to perform the defined actions. Of course, the actions described in course of action 403 may be different for other incidents or incident types. As indicated by the question mark in decision point 624, decision point 624 is a decision step within course of action 403 that does not include logic needed to determine whether course of action 403 should proceed to block IP action 625 or create ticket action 626 in response to the output results of geolocate IP action 622.

In addition to a visual representation of course of action 403, user interface 600 further includes user interface elements execute button 611, new action button 612, and new decision point button 613. When selected by administrator 342, execute button 611 causes incident response system 301 to perform the actions specified in accordance with course of action 403. When selected by administrator 342, new action button 612 adds a new action step to course of action 403. When selected by administrator 342, new decision point button 613 adds a new decision point to course of action 403. Cursor 614 may be used to move blocks around on user interface 600, indicate to which blocks connectors should attach, select "X" elements on blocks to delete the blocks, or perform some other type of user interface manipulation. It should be understood that other forms of interacting with user interface 600 may also or instead be used, such as via touch input to a touchscreen.

Referring back to operation 500, incident response system 301 identifies that decision point 624 lacks the logic necessary to properly direct course of action 403 to block IP action 625 or to create ticket action 626 depending on the output of geolocate IP action 622 (501). While no outputs are defined for decision point 624 in this example, other examples may define outputs for logic directing to a portion, but not all, of the potential paths from decision point 624. In those latter examples, incident response system 301 would only need to determine possible outputs for those paths that are not defined.

In response to identifying decision point 624, incident response system 301 searches courses of action 321 to find other decision points that where outputs of geolocate IP action 622 lead to block IP action 625 (502). Courses of action 321 may comprise only courses of action from a single entity with which administrator 342 is associated (e.g., a business, institution, or other organization) or may include courses of action from other entities to broaden the pool from which incident response system 301 can search. In this example, geolocate IP action 622 outputs a location (e.g., country, region, etc.) associated with an IP address. As such, incident response system 301 determines which locations output by geolocate IP action 622 in courses of action 321 cause subsequent decision steps to direct towards block IP action 625, which will block communications from the IP address. In some examples, a single decision point will cause multiple different outputs (i.e., multiple locations in this case) may direct to a single path (i.e., block IP action 625 in this case). Incident response system 301 may identify all outputs used to direct from geolocate IP action 622 to block IP action 625 in courses of action 321, only the most commonly used outputs, only outputs used in courses of action with a high success rate, or use some other criteria for paring down the outputs identified from courses of action 321. In this example, incident response system 301 determines that location A, location B, and locations A and B are used in various ones of courses of action 321 to direct from geolocate IP action 622 to block IP action 625. Other locations may have been used in some of courses of action 321 but incident response system 301 may have determined that those locations did not satisfy criteria for inclusion in possible outputs for presentation to administrative user system 302. Accordingly, incident response system 301 suggests location A, location B, and locations A and B to administrator 342 as being possible outputs for decision point 624 to use for directing to block IP action 625 (503).

Figure 7:
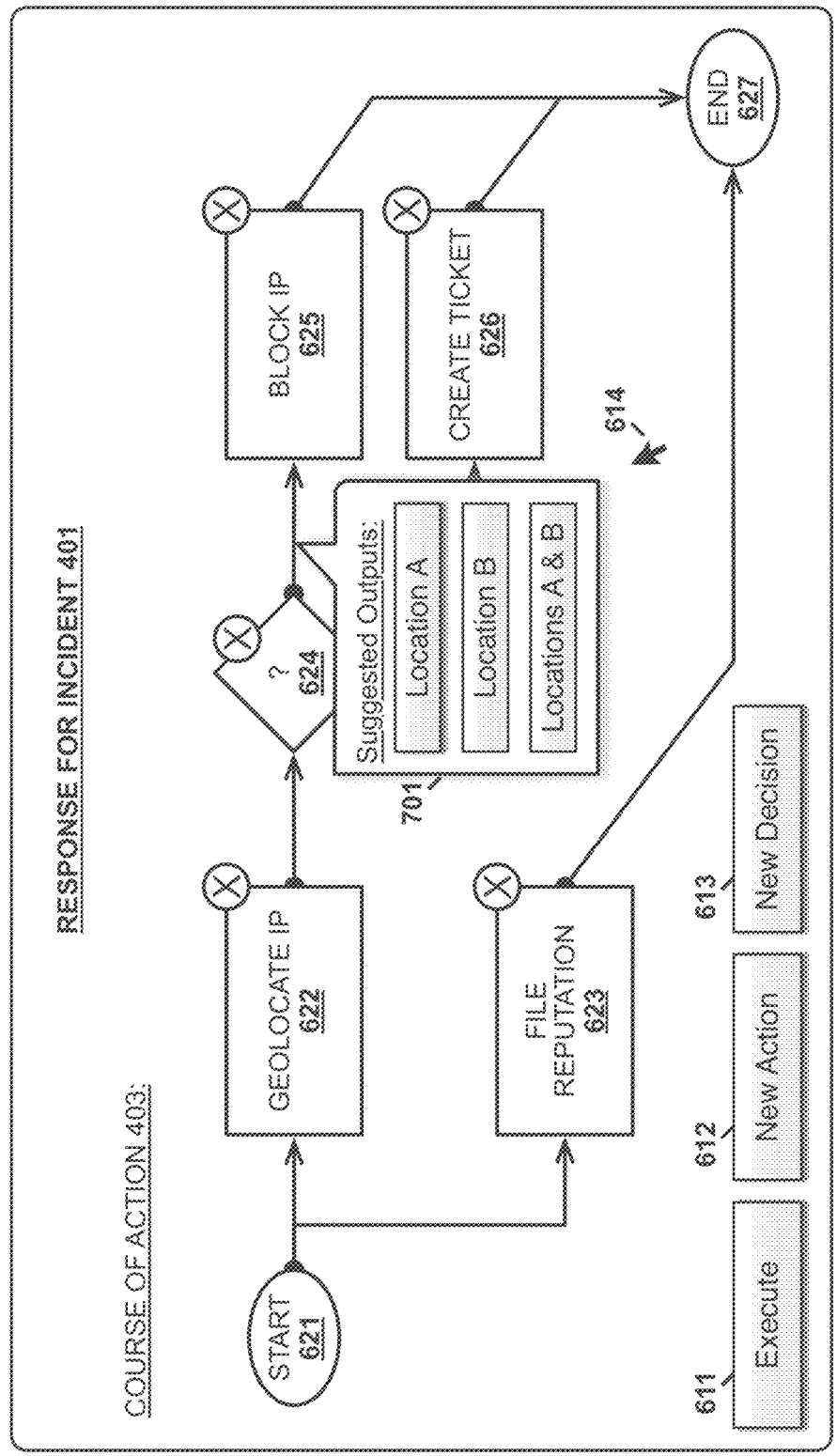
FIG. 7 illustrates another example user interface for automatically determining decision step logic in a course of action for IT incident response.

FIG. 7 illustrates user interface 700 for automatically determining decision step logic in a course of action for IT incident response. In this example, user interface 700 represents user interface 600 once the possible outputs of geolocate IP action 622 that lead to block IP action 625 have been determined by incident response system 301. User interface 700 displays popup interface element 701 that suggests outputs to administrator 342. The suggested outputs are location A, location B, and locations A and B as determined in operation 500 above. Popup interface element 701 is presented in association with the link between decision point 624 and block IP action 625 to visually indicate to administrator 342 to which path of course of action 403 the suggested outputs apply. Each suggested output displayed in popup interface element 701 is also a selectable element that allows administrator 342 to select which outputs administrator 342 wants to be applied to the logic of decision point 624. In some examples, popup interface element 701 may also have an option for administrator 342 to decline the suggested outputs and instead enter a different output that administrator 342 wishes to incorporate into decision point 624. Of course, other manners of suggesting outputs to administrator 342 may be used in other examples. Administrator 342 may explicitly indicate that they want to be presented with suggested outputs (e.g., by using cursor 614 to click on decision point 624) or popup interface element 701 may be displayed automatically with the suggested outputs.

Referring back to operation 500, incident response system 301 receives a selection of location A via administrative user system 302 from the suggested outputs in popup interface element 701 (504). Incident response system 301 then further identifies outputs of geolocate IP action 622 that lead to create ticket action 626 from courses of action 321 in a manner similar to that described above for outputs that lead to block IP action 625 (505). While shown as occurring subsequent to the selection of a suggested output for the path leading to block IP action 625, it should be understood that the determination of outputs leading to create ticket action 626 may be performed at substantially the same time as the determination of outputs leading to block IP action 625. Although, in some examples, the output selection for one path may affect those outputs selected for another path. For instance, since location A was selected above, it would not make sense for incident response system 301 to indicate location A as a possible output leading to create ticket action 626 even if some decision point instances in courses of action 321 did just that. In some cases, a particular output may direct to multiple paths from decision point 624 (e.g., location A may trigger bother block IP action 625 and create ticket action 626 to be performed in parallel). In this example, since create ticket action 626 is the only path from decision point 624 other than block IP action 625, incident response system 301 determines that create ticket action 626 should be a catchall for all locations other than location A that are output by geolocate IP action 622. incident response system 301 suggests to administrator 342 that create ticket action 626 should be directed to in response to outputs of geolocate IP action 622 being any location other than location A (506).

In other examples, decision point 624 may have more than two possible paths stemming therefrom. In those examples, the possible outputs determined by incident response system 301 may include specific locations ((e.g., location C and location D) that should lead to create ticket action 626 rather than a catchall of all locations other than location A. Another step (e.g., a third or fourth path from decision point 624) may therefore be suggested to be the catchall step in those examples.

Figure 8:
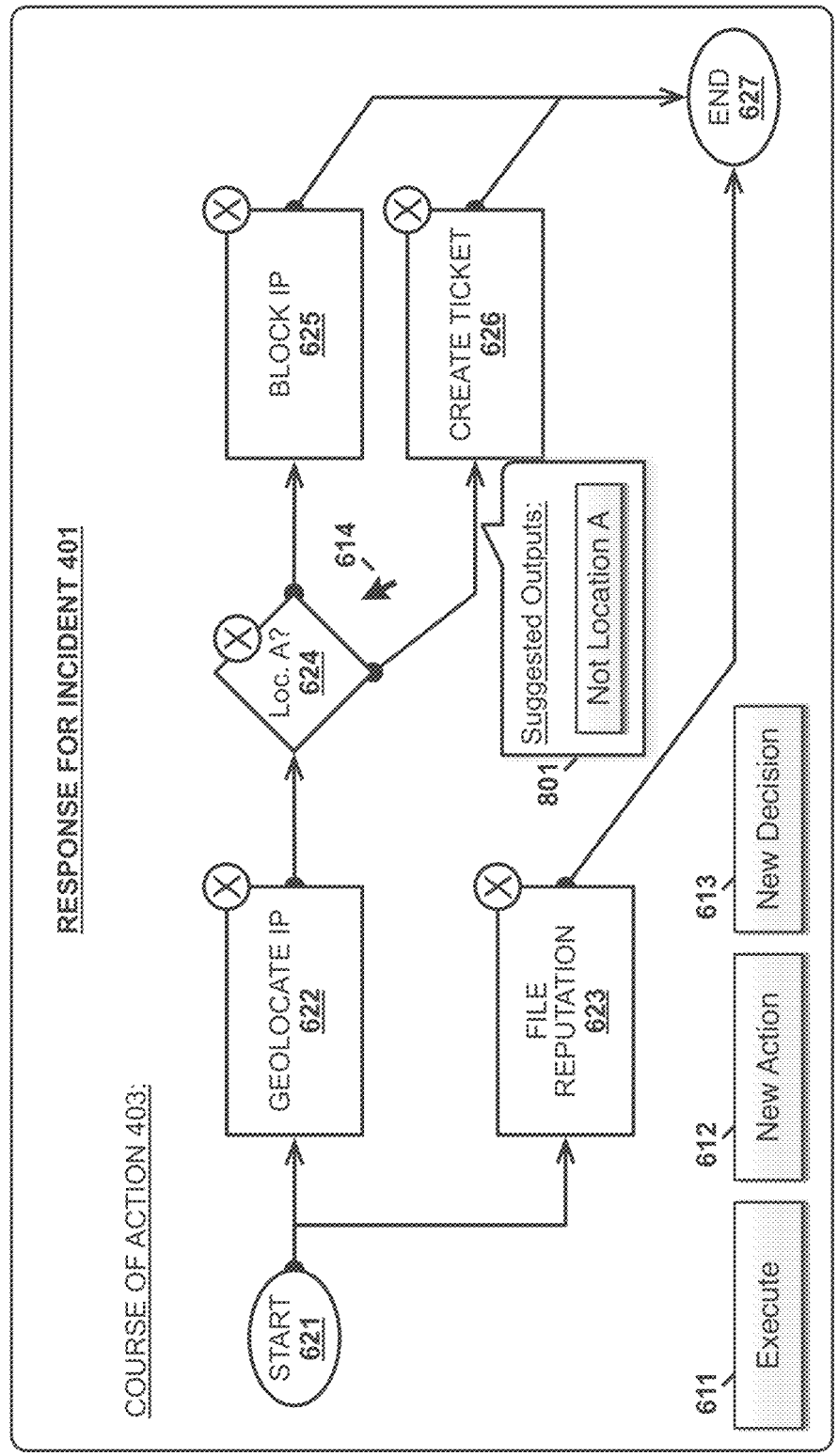
FIG. 8 illustrates yet another example user interface for automatically determining decision step logic in a course of action for IT incident response.

FIG. 8 illustrates user interface 800 for automatically determining decision step logic in a course of action for IT incident response. In this example, user interface 800 represents user interface 600 once the possible outputs of geolocate IP action 622 that lead to create ticket action 626 have been determined by incident response system 301. User interface 800 displays popup interface element 801 that suggests outputs to administrator 342. The suggested outputs are anything other than location A. Popup interface element 801 is presented in association with the link between decision point 624 and create ticket action 626 to visually indicate to administrator 342 to which path of course of action 403 the suggested outputs apply. The suggested output displayed in popup interface element 801 (i.e., not location A) is also a selectable element that allows administrator 342 to select to select the suggested output to indicate that administrator 342 accepts the suggestion of incident response system 301. In some examples, popup interface element 801 may also have an option for administrator 342 to decline the suggested output and instead enter a different output that administrator 342 wishes to incorporate into decision point 624. Of course, other manners of suggesting output to administrator 342 may be used in other examples. Administrator 342 may explicitly indicate that they want to be presented with suggested outputs (e.g., by using cursor 614 to click on decision point 624) or popup interface element 701 may be displayed automatically with the suggested outputs.

Again, referring back to operation 500, incident response system 301 receives a selection of any location but location A via administrative user system 302 from the suggested output in popup interface element 801 (507). Responsive to now having the necessary outputs to complete the logic to be used by decision point 624, incident response system 301 converts the outputs selection into Boolean logic for use by decision point 624 and incorporates that logic into decision point 624 (508). For example, the logic created by incident response system 301 may be, at a high level, "if the location output by geolocate IP action 622 is location A, then proceed to block IP action 625, else, proceed to create ticket action 626." Once the logic is incorporated into decision point 624, course of action 403 for this example is complete and ready to execute. Upon administrator 342 selecting execute button 611, incident response system 301 will follow course of action 403 to response to incident 401.

Figure 5B:
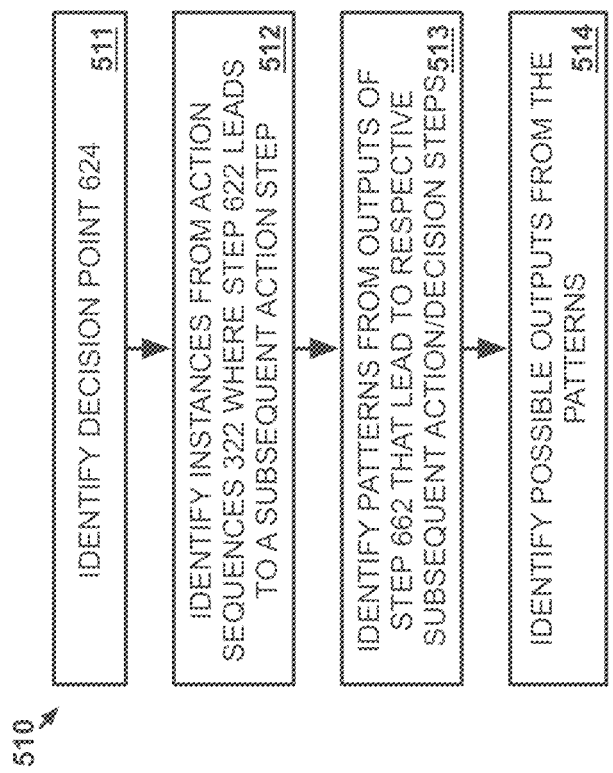
FIG. 5B illustrates one more example operation for automatically determining decision step logic in a course of action for IT incident response.

FIG. 5B illustrates a flow diagram of operation 510 for automatically determining decision step logic in a course of action for IT incident response. Operation 510 may be performed in conjunction with operation 500 to determine potential outputs or only one of operations 500 and 510 may be used to determine potential outputs. Operation 510 is again described with respect to course of action 403 described in user interfaces 600-800 but, it should be understood, that similar steps may be performed with respect to other courses of action. In operation 510, incident response system 301 identifies that decision point 624 lacks the logic necessary to properly direct course of action 403 to block IP action 625 or to create ticket action 626 depending on the output of geolocate IP action 622 (511). In some examples, decision point 624 may not yet explicitly be placed in course of action 403 incident response system 301. Instead, incident response system 301 may determine, based on the patterns discussed below, that decision point 624 should be placed in course of action 403.

In this example, incident response system 301 maintains action sequences 322. Action sequences 322 include actions sequences of two or more action steps that were previously performed by incident response system 301 or, possibly, some other incident response system. Action sequences 322 may have been initiated by one or more of administrators 342-344, automatically by incident response system 301, or by some other instructing entity. In some examples, action sequences 322 may include courses of action 321 since a course of action is a pre-defined action sequence. The resulting output of a particular action that is taken immediately prior to another action in action sequences 322 is also maintained within action sequences 322. Maintaining the outputs allows incident response system 301 to identify patterns in those outputs that lead to particular other actions, as discussed in more detail below.

In operation 510, incident response system 301 processes action sequences 322 to identify action sequences having an action step that was performed subsequently to geolocate IP action 622 (512). If those subsequent action steps have already been placed in course of action 403, as are block IP action 625 and create ticket action 626, then incident response system 301 may specifically identify action sequences with those already placed action steps occurring after geolocate IP action 622. Even the subsequent action steps have already been defined, incident response system 301 may still identify other subsequent action steps from within action sequences 322 so that incident response system 301 can suggest additional subsequent action steps for incident response system 301 that administrator 342 had not thought to add.

Incident response system 301 then processes the identified action sequences to identify patterns from the outputs of geolocate IP action 622 in those action sequences that lead to the respective subsequent action steps (513). In other examples, it is possible that another decision point may occur subsequently to decision point 624 rather than only additional action steps, as described in this example. The patterns may be defined based on thresholds. For example, a threshold may be set such that, if greater than 80% of the time in action sequences 322 a particular output of geolocate IP action 622 is followed by performance of a particular other action, then incident response system 301 will determine that a pattern exists where the particular other action is performed in response to the particular output. Other types of pattern recognition, including those that are more dynamically defined, such as machine learning algorithms, may also be used. In some examples, the patterns may be identified across multiple subsequent action steps. For instance, incident response system 301 may be able to identify a pattern that output of location A from geolocate IP action 622 usually (e.g., in greater than 95% of action sequences) precedes block IP action 625 while other locations usually (e.g., greater than 95% of the time) precede create ticket action 626.

The patterns identified by incident response system 301 above are then used to determine potential outputs of geolocate IP action 622 that should be suggested for used in the logic of decision point 624 (514). Incident response system 301 may determine that all outputs from the identified patterns should be suggested to administrator 342 or may use criteria to determine which outputs in the patterns should be suggested. For example, if block IP action 625 and create ticket action 626 have already been defined, then only those patterns with outputs that direct to either block IP action 625 or create ticket action 626 may be used as potential outputs for decision step 624. In other examples, only output in those patterns that were identified from action sequences that were considered successful, as indicated in action sequences 322, are used as potential outputs by incident response system 301. Other types of criteria may also be used to select potential outputs from the identified patterns.

Once potential outputs are identified, incident response system 301 may suggest the potential outputs to administrator 342, and receive selections from administrator 342, in a manner similar to that described for operation 500. The selected outputs would then be incorporated into the logic of decision point 624. In this example, if the subsequent steps block IP action 625 and create ticket action 626 have not already been defined by administrator 342, then incident response system 301 may also suggest those action steps in association with the possible outputs of geolocate IP action 622 that lead thereto. Advantageously, what once may have been independent action sequences in action sequences 322 for handling incidents are now combined into a single course of action 403 via decision point 624. That is, one action sequence may have performed block IP action 625 after geolocate IP action 622 in response to location A being output by geolocate IP action 622 while a different action sequence may have performed create ticket action 626 after geolocate IP action 622 in response to other locations being output by geolocate IP action 622. Course of action 403 effectively combines those two action sequences into a single course of action 403.

In some cases, incident response system 301 may not be able to identify patterns or outputs that satisfy required thresholds for inclusion in the possible outputs. For instance, action sequences 322 may not include enough relevant sequences or otherwise relevant information (e.g., those that include geolocate IP action 622) for a pattern to be recognized. As such, incident response system 301 may not be able to suggest outputs for one or more of the branches stemming from decision point 624. In those cases, incident response system 301 may indicate via the user interface of administrative user system 302 that no possible outputs were identified for certain paths (possibly all paths) and provide administrator 342 with the ability to manually enter logic into decision point 624.

FIG. 9 illustrates incident response system 900 for automatically determining decision step logic in a course of action for IT incident response. Incident response system 900 is an example computing architecture for incident response system 101 and incident response system 301, although alternative configurations may also be used. Incident response system 900 may similarly be an example architecture for other elements described above, such as user system 102 and administrative user system 302, although alternative configurations may also be used. Incident response system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises processing circuitry, such as a microprocessor, and other circuitry that retrieves and executes operating software 907 from memory device 906. Memory device 906 comprises one or more computer-readable storage media, such as a disk drive, flash drive, data storage circuitry, or some other memory apparatus that in no cases should be considered a mere propagated signal. Operating software 907 comprises computer programs, firmware, or some other form of machine-readable processing instructions. Operating software 907 includes output determination module 908 and logic incorporation module 909. Operating software 907 may further include an operating system, utilities, drivers, network interfaces, applications, or some other type of software. When executed by circuitry 905, operating software 907 directs processing system 903 to operate incident response system 900 as described herein.

In particular, output determination module 908 directs processing system 903 to determine that a decision step occurs between a one step and two or more other steps of a first course of action associated with an incident type in the information technology environment. Output determination module 908 further directs processing system 903 to determine possible outputs of the one step that, when used as input to the decision step, cause the first course of action to proceed from the decision step to respective steps of the two or more other steps. Logic incorporation module 909 directs processing system 903 to incorporate logic into the decision step to direct the course of action to respective steps of the two or more other steps based on one or more of the possible outputs.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for incident response in an information technology (IT) environment, the method comprising:
   for a first course of action associated with an incident type in the IT environment, wherein the first course of action comprises a set of steps that instruct an incident response system to perform actions when responding to an incident of the incident type in the IT environment, determining that a decision step of the set of steps of the first course of action, lacks decision logic to direct the first course of action from a preceding step of the first course of action to one or more subsequent steps of the first course of action, wherein the preceding step precedes the decision step in the first course of action, and the subsequent steps comprise two or more steps that follow the decision step in the first course of action;
   determining outputs of the preceding step in other courses of action that cause the other courses of action to proceed from the decision step to respective one or more subsequent steps;
   based on determining the outputs of the preceding step in the other courses of action, determining possible outputs of the preceding step of the first course of action that, when used as input to the decision step, cause the first course of action to proceed from the decision step to one or more respective subsequent steps; and
   incorporating decision logic into the decision step to direct the first course of action to the one or more respective subsequent steps based on one or more of the possible outputs of the preceding step being input to the decision step.

2. The method of claim 1, wherein incorporating the decision logic into the decision step comprises creating Boolean logic associated with each of the subsequent steps, wherein the Boolean logic operates on output of the preceding step.

3. The method of claim 1, further comprising, after incorporating the decision logic into the decision step:
   performing the first course of action on an incident in the IT environment; or
   storing the first course of action for later performance on a future incident in the IT environment.

4. The method of claim 1, wherein determining the possible outputs of the preceding step of the first course of action comprises:
   determining an output of the preceding step in the other courses of action that causes the other courses of action to proceed from the decision step to one or more respective subsequent steps; and
   selecting the possible outputs of the preceding step of the first course of action from the output of the preceding step in the other courses of action.

5. The method of claim 1, wherein determining the possible outputs of the preceding step of the first course of action comprises:
   determining an output of the preceding step in the other courses of action that causes the other courses of action to proceed from the decision step to one or more respective subsequent steps; and
   selecting the possible outputs of the preceding step of the first course of action from the output of the preceding step in the other courses of action that occur above a threshold frequency in the other courses of action.

6. The method of claim 1, wherein determining the possible outputs of the preceding step of the first course of action comprises:
   identifying patterns from outputs from the preceding step in previously performed action sequences; and
   identifying the possible outputs of the preceding step of the first course of action from the patterns.

7. The method of claim 1, wherein incorporating the decision logic into the decision step comprises causing display of the decision logic in a visual programming language representation of the first course of action.

8. One or more non-transitory computer-readable storage media having program instructions stored thereon for incident response in an information technology (IT) environment, wherein the program instructions, when read and executed by a processing system, direct the processing system to:
   for a first course of action associated with an incident type in the IT environment, wherein the first course of action comprises a set of steps that instruct an incident response system to perform actions when responding to an incident of the incident type in the IT environment, determine that a decision step, of the set of steps of the first course of action, lacks decision logic to direct the first course of action from a preceding step of the first course of action to one or more subsequent steps of the first course of action, wherein the preceding step precedes the decision step in the first course of action, and the subsequent steps comprise two or more steps that follow the decision step in the first course of action;
   determine outputs of the preceding step in other courses of action that cause the other courses of action to proceed from the decision step to respective one or more subsequent steps;

based on determining the outputs of the preceding step in the other courses of action, determine possible outputs of the preceding step of the first course of action that, when used as input to the decision step, cause the first course of action to proceed from the decision step to one or more respective subsequent steps; and incorporate decision logic into the decision step to direct the first course of action to the one or more respective subsequent steps based on one or more of the possible outputs of the preceding step being input to the decision step.

9. The one or more computer-readable storage media of claim 8, wherein to incorporate the decision logic into the decision step, the program instructions direct the processing system to create Boolean logic associated with each of the subsequent steps, wherein the Boolean logic operates on output of the preceding step.

10. The one or more computer-readable storage media of claim 8, wherein the program instructions further direct the processing system to, after the decision logic is incorporated into the decision step:

perform the first course of action on an incident in the IT environment; or store the first course of action for later performance on a future incident in the IT environment.

11. The one or more computer-readable storage media of claim 8, wherein to determine the possible outputs of the preceding step of the first course of action, the program instructions direct the processing system to:

determine an output of the preceding step in the other courses of action that causes the other courses of action to proceed from the decision step to one or more respective subsequent steps; and select the possible outputs of the preceding step of the first course of action from the output of the preceding step in the other courses of action.

12. The one or more computer-readable storage media of claim 8, wherein to determine the possible outputs of the preceding step of the first course of action, the program instructions direct the processing system to:

determine an output of the preceding step in the other courses of action that causes the other courses of action to proceed from the decision step to one or more respective subsequent steps; and select the possible outputs of the preceding step of the first course of action from the output of the preceding step in the other courses of action that occur above a threshold frequency in the other courses of action.

13. The one or more computer-readable storage media of claim 8, wherein to determine the possible outputs of the preceding step of the first course of action, the program instructions direct the processing system to:

identify patterns from outputs from the preceding step in previously performed action sequences; and identify the possible outputs of the preceding step of the first course of action from the patterns.

14. The one or more computer-readable storage media of claim 8, wherein to incorporate the decision logic into the decision step the program instructions direct the processing system to cause display of the decision logic in a visual programming language representation of the first course of action.

15. An apparatus for incident response in an information technology (IT) environment, the apparatus comprising:

one or more non-transitory computer-readable storage media;

a processing system operatively coupled with the one or more computer-readable storage media; and program instructions stored on the one or more computer-readable storage media that, when read and executed by the processing system, direct the processing system to:

for a first course of action associated with an incident type in the IT environment, wherein the first course of action comprises a set of steps that instruct an incident response system to perform actions when responding to an incident of the incident type in the IT environment, determine that a decision step, of the set of steps of the first course of action, lacks decision logic to direct the first course of action from a preceding step of the first course of action to one or more subsequent steps of the first course of action, wherein the preceding step precedes the decision step in the first course of action, and the subsequent steps comprise two or more steps that follow the decision step in the first course of action;

determine outputs of the preceding step in other courses of action that cause the other courses of action to proceed from the decision step to respective one or more subsequent steps;

based on determining the outputs of the preceding step in the other courses of action, determine possible outputs of the preceding step of the first course of action that, when used as input to the decision step, cause the first course of action to proceed from the decision step to one or more respective subsequent steps; and incorporate decision logic into the decision step to direct the first course of action to the one or more respective subsequent steps based on one or more of the possible outputs of the preceding step being input to the decision step.

16. The apparatus of claim 15, wherein to incorporate the decision logic into the decision step, the program instructions direct the processing system to create Boolean logic associated with each of the subsequent steps, wherein the Boolean logic operates on output of the preceding step.

17. The apparatus of claim 15, wherein the program instructions further direct the processing system to, after the decision logic is incorporated into the decision step:

perform the first course of action on an incident in the IT environment; or store the first course of action for later performance on a future incident in the IT environment.

18. The apparatus of claim 15, wherein to determine the possible outputs of the preceding step of the first course of action, the program instructions direct the processing system to:

determine an output of the preceding step in the other courses of action that causes the other courses of action to proceed from the decision step to one or more respective subsequent steps; and select the possible outputs of the preceding step of the first course of action from the output of the preceding step in the other courses of action.

19. The apparatus of claim 15, wherein to determine the possible outputs of the preceding step of the first course of action, the program instructions direct the processing system to:

determine an output of the preceding step in the other courses of action that causes the other courses of action to proceed from the decision step to one or more respective subsequent steps; and select the possible outputs of the preceding step of the first course of action from the output of the preceding step in the other courses of action that occur above a threshold frequency in the other courses of action.

20. The apparatus of claim 15, wherein to determine the possible outputs of the preceding step of the first course of action, the program instructions direct the processing system to:
   identify patterns from outputs from the preceding step in previously performed action sequences; and
   identify the possible outputs of the preceding step of the first course of action from the patterns.

\* \* \* \* \*